United States Patent
Wang

(10) Patent No.: US 12,314,127 B2
(45) Date of Patent: May 27, 2025

(54) PCIe FAULT AUTO-REPAIR METHOD, APPARATUS AND DEVICE, AND READABLE STORAGE MEDIUM

(71) Applicant: SHANDONG YINGXIN COMPUTER TECHNOLOGIES CO., LTD., Shandong (CN)

(72) Inventor: Peipei Wang, Shandong (CN)

(73) Assignee: SHANDONG YINGXIN COMPUTER TECHNOLOGIES CO., LTD., Shandong (CN)

( * ) Notice: Subject to any disclaimer, the term of this patent is extended or adjusted under 35 U.S.C. 154(b) by 0 days.

(21) Appl. No.: 18/270,186

(22) PCT Filed: Apr. 28, 2022

(86) PCT No.: PCT/CN2022/089743
§ 371 (c)(1),
(2) Date: Jun. 28, 2023

(87) PCT Pub. No.: WO2022/228499
PCT Pub. Date: Nov. 3, 2022

(65) Prior Publication Data
US 2024/0103961 A1 Mar. 28, 2024

(30) Foreign Application Priority Data
Apr. 29, 2021 (CN) .......................... 202110474250.9

(51) Int. Cl.
*G06F 11/07* (2006.01)
(52) U.S. Cl.
CPC ...... *G06F 11/0793* (2013.01); *G06F 11/0745* (2013.01)
(58) Field of Classification Search
CPC ............. G06F 11/0793; G06F 11/0745; G06F 2201/81; G06F 11/076
(Continued)

(56) References Cited

U.S. PATENT DOCUMENTS 10,908,987 B1\* 2/2021 Pandey ................. G06F 3/0659
2013/0246855 A1 9/2013 Nishiyama
(Continued)

FOREIGN PATENT DOCUMENTS

CN 105808394 A 7/2016
CN 107066417 A 8/2017
(Continued)

OTHER PUBLICATIONS

International Search Report for PCT/CN2022/089743 mailed on Jul. 6, 2022 (5 pages including English Translation).
(Continued)

*Primary Examiner* — Yair Leibovich
(74) *Attorney, Agent, or Firm* — Merchant & Gould P.C.

(57) ABSTRACT

A Peripheral Component Interconnect express (PCIe) fault auto-repair method is provided. According to the method, when a PCIe link in a system runs, an operation state of the system is monitored by acquiring a Correctable Error (CE) error count and an Uncorrectable Error (UCE) error count in the PCIe link; when the CE error count reaches a corresponding error threshold value, or the UCE error count reaches a corresponding error threshold value, an error device is removed from the system to avoid continuous adverse influence of the error device on operation of the system. Moreover, an SI parameter register of the error device is modified according to pre-stored optimization parameters of all PCIe devices in a server, the SI parameter of the error device is automatically optimized, and the error device is re-accessed to the system after the PCIe fault repair.

20 Claims, 3 Drawing Sheets

(58) Field of Classification Search
 USPC .......................................................... 714/5.1
 See application file for complete search history.

(56) References Cited

U.S. PATENT DOCUMENTS

| | | |
|---|---|---|
| 2014/0181621 A1 | 6/2014 | Lin et al. |
| 2017/0091013 A1 | 3/2017 | Tallam et al. |
| 2021/0089418 A1* | 3/2021 | Das Sharma ......... G06F 11/263 |

FOREIGN PATENT DOCUMENTS

| | | |
|---|---|---|
| CN | 109376028 A | 2/2019 |
| CN | 111008091 A | 4/2020 |
| CN | 111984477 A | 11/2020 |
| CN | 112015597 A | 12/2020 |
| CN | 113176963 A | 7/2021 |

OTHER PUBLICATIONS

Written Opinion for PCT/CN2022/089743 mailed on Jul. 6, 2022 (4 pages).
Chinese Search Report for Application No. 2021104742509 dated Mar. 12, 2022 (2 pages).
Chinese Search Report for Application No. 2021104742509 dated Aug. 3, 2022 (2 pages).

* cited by examiner

Fig. 2

Device 1:
Device: B/D/F number
Uplink port: B/D/F number
First group of recommended values:
Device Tx preset1, Uplink port Rx coefficient1; Uplink port Tx preset1, Device Rx coefficient1
Second group of recommended values: Device Tx preset2, Uplink port Rx coefficient2; Uplink port Tx preset2, Device Rx coefficient2
...

Device 2:
Device: B/D/F number
Uplink port: B/D/F number
First group of recommended values:
Device Tx preset1, Uplink port Rx coefficient1; Uplink port Tx preset1, Device Rx coefficient1
Second group of recommended values: Device Tx preset2, Uplink port Rx coefficient2; Uplink port Tx preset2, Device Rx coefficient2
...

Device 3:
...

... ...

PCIe FAULT AUTO-REPAIR METHOD, APPARATUS AND DEVICE, AND READABLE STORAGE MEDIUM

CROSS-REFERENCE TO RELATED APPLICATION

The present application is a National Stage Filing of PCT International Application No. PCT/CN2022/089743 filed on Apr. 28, 2022, which claims priority to Chinese Patent Application 202110474250.9, filed in the China National Intellectual Property Administration on Apr. 29, 2021, and entitled "PCIe Fault Auto-Repair Method, Apparatus and Device, and Readable Storage Medium", the entire contents of which are herein incorporated by reference.

TECHNICAL FIELD

The present disclosure relates to the technical field of device operation and maintenance, and in particular to a Peripheral Component Interconnect express (PCIe) fault auto-repair method, apparatus and device, and a readable storage medium.

BACKGROUND

A PCIe (which is a high-speed serial computer expansion bus standard) device is an indispensable component in a server, and the performance, calculation, functions and the like of the server are all related to the PCIe device. The PCIe device further relates to the calculation (such as Graphics Processing Unit (GPU) and Field Programmable Gate Array (FPGA)), storage (such as Serial Attached SCSI (SAS) Host Bus Adapter (HBA), Nonvolatile Memory Express (NVME) Solid State Drive (SSD)), and network (Network Interface Card (NIC)) of the server, and plays an important role.

A PCIe error report may occur in use with the long-term operation of the device, the ageing of the device, and the common influence of a plurality of devices in a complex PCIe link. At present, after a server system runs, the server system has an automatic error report mechanism. When a PCIe error is reported in the system, some small problems may be automatically repaired, but most of the problems cannot be automatically repaired by the system, resulting in blocked operation of the system, and even resulting in machine crash or restart, such that the device cannot run normally. Moreover, most of reported PCIe errors require manual fault judgment and troubleshooting of operation and maintenance personnel, resulting in manpower consumption of the operation and maintenance personnel and a cost increase caused by device replacement.

In summary, how to reduce influence of reported PCIe errors on operation of the system and to reduce PCIe operation and maintenance costs are technical problems to be solved urgently by those having ordinary skill in the art at present.

SUMMARY

The embodiments of the present disclosure provide a PCIe fault auto-repair method, apparatus and device, and a readable storage medium, which may reduce influence of reported PCIe errors on operation of a system, and reduce PCIe operation and maintenance costs.

In order to solve the above technical problems, the embodiments of the present disclosure provide the following technical solutions.

A PCIe fault auto-repair method includes:
when a PCIe link performs data processing according to a default Signal Integrity (SI) parameter, acquiring a Correctable Error (CE) error count and an Uncorrectable Error (UCE) error count in the PCIe link, wherein the default SI parameter is an SI parameter which is generated by automatic training after a system is started;
determining whether the CE error count reaches an error threshold value corresponding to the CE error count and the UCE error count reaches an error threshold value corresponding to the UCE error count;
in response to determining that the CE error count reaches the error threshold value corresponding to the CE error count, or the UCE error count reaches the error threshold value corresponding to the UCE error count, positioning an error device, and removing the error device;
reading, from pre-stored PCIe optimization parameters, a parameter to be called corresponding to the error device as a target parameter;
replacing the default SI parameter of the error device with the target parameter; and
accessing the error device to the system as a normal device.

In some exemplary embodiments, when the PCIe link performs the data processing according to the default SI parameter, acquiring the CE error count and the UCE error count in the PCIe link includes:
when the PCIe link performs the data processing according to the default SI parameter, polling a CE register and a UCE register of each PCIe device; and
using a receiver error count recorded in the CE register as the CE error count, and using a receiver error count recorded in the UCE register as the UCE error count.

In some exemplary embodiments, reading, from the pre-stored PCIe optimization parameters, the parameter to be called corresponding to the error device as the target parameter includes:
reading the PCIe optimization parameters stored in a Baseboard Management Controller (BMC) Electrically Erasable Programmable Read Only Memory (EE-PROM);
determining, as a target location, a corresponding SI parameter storage location according to a Bus/Device/Function (B/D/F) number of the error device;
determining, as the parameter to be called, an optimization parameter with highest priority at the target location; and
reading the parameter to be called.

In some exemplary embodiments, before accessing the error device to the system as the normal device, the method further includes:
accessing the error device to the system as a suspicious device; and
executing an operation of acquiring the CE error count and the UCE error count in the PCIe link, until the CE error count does not reach the error threshold value corresponding to the CE error count and the UCE error count does not reach the error threshold value corresponding to the UCE error count, executing an operation of accessing the error device to the system as the normal device.

A PCIe fault auto-repair apparatus includes:
an operation monitoring unit configured to, when a PCIe link performs data processing according to a default Signal Integrity (SI) parameter, acquire a Correctable Error (CE) error count and an Uncorrectable Error (UCE) error count in the PCIe link, wherein the default SI parameter is an SI parameter which is generated by automatic training after a system is started;
an operation determining unit, configured to determine whether the CE error count reaches an error threshold value corresponding to the CE error count and the UCE error count reaches an error threshold value corresponding to the UCE error count;
a fault removing unit configured to, in response to determining that the CE error count reaches the error threshold value corresponding to the CE error count, or the UCE error count reaches the error threshold value corresponding to the UCE error count, position an error device, and remove the error device;
a parameter reading unit, configured to read, from pre-stored PCIe optimization parameters, a parameter to be called corresponding to the error device as a target parameter;
a fault repairing unit, configured to replace the default SI parameter of the error device with the target parameter; and
a device accessing unit, configured to access the error device to the system as a normal device.

In some exemplary embodiments, the operation monitoring unit includes:
a register polling sub-unit configured to, when the PCIe link performs the data processing according to the default SI parameter, poll a CE register and a UCE register of each PCIe device; and
a data reading sub-unit, configured to use a receiver error count recorded in the CE register as the CE error count, and use a receiver error count recorded in the UCE register as the UCE error count.

In some exemplary embodiments, the parameter reading unit includes:
a data reading sub-unit, configured to read the PCIe optimization parameters stored in a Baseboard Management Controller (BMC) Electrically Erasable Programmable Read Only Memory (EEPROM);
a data positioning sub-unit, configured to determine, as a target location, a corresponding SI parameter storage location according to a Bus/Device/Function (B/D/F) number of the error device;
a target determining sub-unit, configured to determine, as the parameter to be called, an optimization parameter with highest priority at the target location; and
a target reading sub-unit, configured to read the parameter to be called.

In some exemplary embodiments, the PCIe fault auto-repair apparatus further includes: a suspicious device monitoring unit, wherein the suspicious device monitoring unit is configured to access the error device to the system as a suspicious device; trigger the operation monitoring unit to execute the operation of acquiring the CE error count and the UCE error count in the PCIe link; and until the CE error count does not reach the error threshold value corresponding to the CE error count and the UCE error count does not reach the error threshold value corresponding to the UCE error count, trigger the device accessing unit to execute the operation of accessing the error device to the system as the normal device.

A PCIe fault auto-repair device includes:
a memory, configured to store a computer program; and
a processor, configured to implement the operations of the PCIe fault auto-repair method when executing the computer program.

A readable storage medium, wherein a computer program is stored on the non-transitory readable storage medium, and the computer program, when executed by a processor, causes the processor to implement the operations of the PCIe fault auto-repair method.

According to the method provided in the embodiments of the present disclosure, when a PCIe link in a system runs, an operation state of the system is monitored by acquiring a CE error count and a UCE error count in the PCIe link: in response to determining that the CE error count reaches the error threshold value corresponding to the CE error count, or the UCE error count reaches the error threshold value corresponding to the UCE error count, it is determined that the current PCIe is faulty, the error device is removed from the system to avoid continuous adverse influence of continuous operation of the error device on operation of the system. Moreover, an SI parameter register of the error device is modified according to pre-stored optimization parameters of all PCIe devices in a server, the SI parameter of the error device is automatically optimized, and the error device is re-accessed to the system after the PCIe fault repair by means of optimizing the SI parameter, thereby implementing fault auto-repair, reducing the implementation cost and adverse influence on operation of the system, which are caused by the participation of operation and maintenance personnel and server customer service personnel in device replacement, and optimizing operation of the system.

Correspondingly, the embodiments of the present disclosure further provide a PCIe fault auto-repair apparatus and device, and a readable storage medium corresponding to the PCIe fault auto-repair method, which have the above technical effects, and thus details are not described herein again.

BRIEF DESCRIPTION OF THE DRAWINGS

To illustrate technical solutions in the embodiments of the present disclosure or the related art more clearly; a brief introduction on the drawings which are needed in the description of the embodiments or related art is given below: Apparently, the drawings in the description below are merely some of the embodiments of the present disclosure, based on which other drawings may be obtained by those having ordinary skill in the art without any creative effort.

FIG. 2 is a schematic diagram of a storage format of optimization parameters in an EEPROM according to some embodiments of the present disclosure;

DETAILED DESCRIPTION

The embodiments of the present disclosure provide a PCIe fault auto-repair method, which may reduce influence of reported PCIe errors on operation of a system, and reduce PCIe operation and maintenance costs.

In order to enable those having ordinary skill in the art to better understand the solutions of the present disclosure, the present disclosure is further described in detail below in combination with the drawings and exemplary embodiments. Apparently, the embodiments described below are merely a part, but not all, of the embodiments of the present disclosure. All of other embodiments, obtained by those having ordinary skill in the art based on the embodiments in the present disclosure without any creative effort, fall into the protection scope of the present disclosure.

Figure 1:
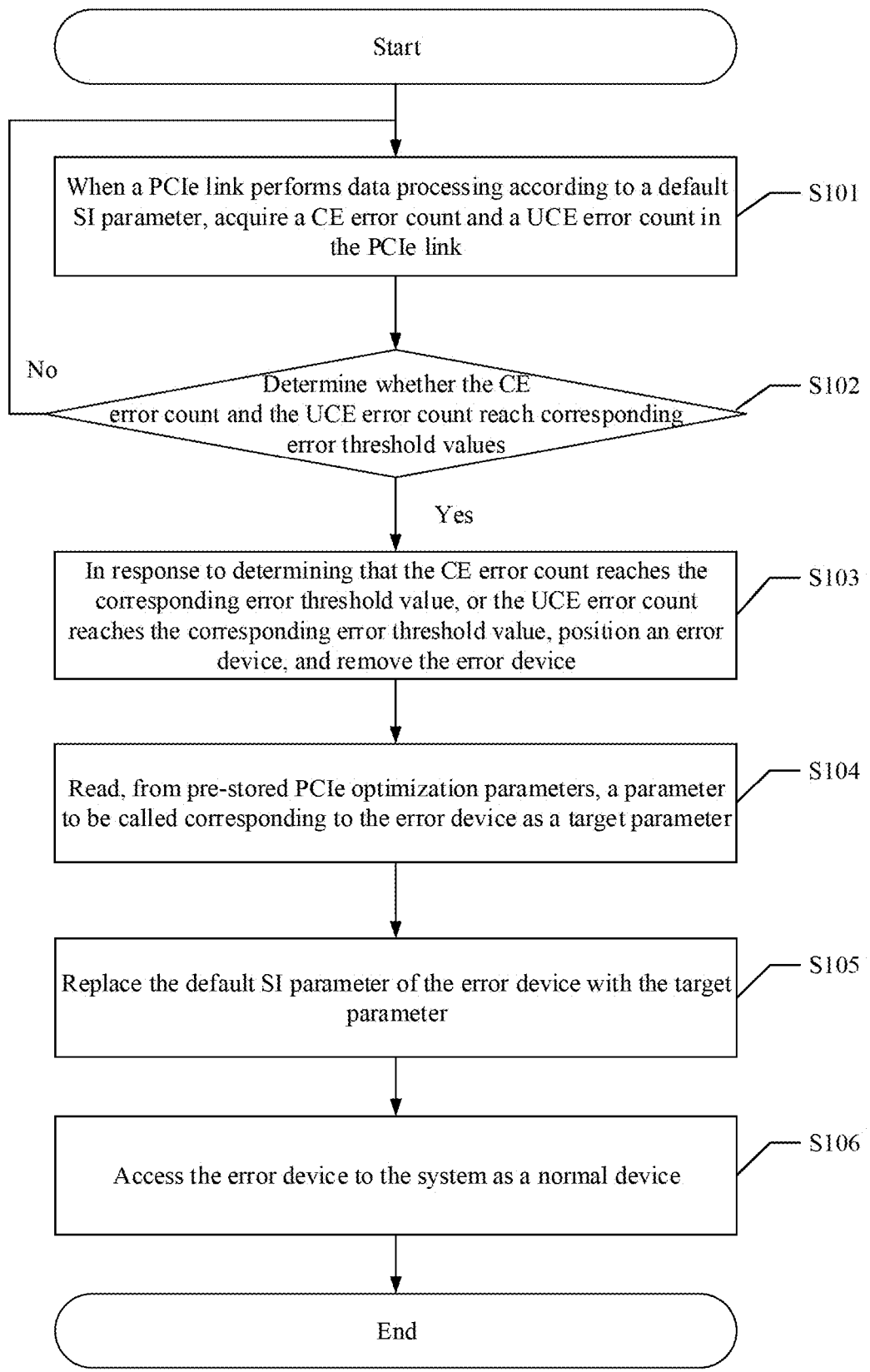
FIG. 1 is an implementation flowchart of a PCIe fault auto-repair method according to some embodiments of the present disclosure.

Please refer to FIG. 1, which is a flowchart of a PCIe fault auto-repair method according to some embodiments of the present disclosure, the method includes the following operations S101 to S106.

At S101, when a PCIe link performs data processing according to a default SI parameter, a CE error count and a UCE error count in the PCIe link are acquired.

After a server is powered on, an automatic training (PCIe link training) process based on a PCIe protocol may generate, as a default SI parameter, an SI parameter (which may include, for example, a device Tx preset value, an uplink port Rx coefficient parameter, an uplink port Tx preset value, a device Rx coefficient parameter and other parameters) of a PCIe device. An implementation in the related art may be utilized to generate the SI parameter, and no further description is made in the present embodiment.

After the default SI parameter is generated, all PCIe devices in the PCIe link perform data processing according to the default SI parameter. The PCIe link may include one or more PCIe devices (in the present embodiment, devices running based on a PCIe bus standard may all be referred to as PCIe devices, and device types and device functions are not limited herein), the number of the PCIe devices in the PCIe link is not limited, and each PCIe device performs data processing according to the default SI parameter.

The errors of the PCIe may be classified into Correctable Errors (CEs) and Uncorrectable Errors (UCEs). After the system is started, an automatic error report mechanism is set in the server system, when a PCIe error occurs in the system, the correctable error (CE) may be automatically identified by hardware and automatically corrected or repaired, but the system cannot automatically repair the UCE. A BIOS reports the PCIe error to a BMC after acquiring the PCIe error, and records a log, that is, the system records a CE error count and a UCE error count. In the present embodiment, the CE error count and the UCE error count, which are recorded in the system, are acquired and further determination is performed based on the acquired CE error count and UCE error count. If the system does not record or cannot read error information recorded in the system, a corresponding error detection mechanism may also be set, which is not limited in the present embodiment.

In order to simplify the implementation process and improve the efficiency of acquiring the error count, the process of acquiring the CE error count and the UCE error count in the PCIe link may include: a CE register and a UCE register of each PCIe device are polled; and a receiver error count recorded in a CE register is used as the CE error count, and a receiver error count recorded in a UCE register is used as the UCE error count.

According to the above implementation, an error register of the PCIe device and a Root port (e.g., a CPU PCIe port) end are monitored during the operation process of the server system, the operation state of the PCIe device is monitored in real time by polling the CE register and the UCE register of the PCIe device, so as to acquire the receiver error count of CE and the receiver error count of UCE, and determine whether a (CE or UCE) fault occurs in the PCIe device based on the acquired receiver error count of CE and receiver error count of UCE. The implementation is simplified by directly reading the register. Meanwhile, the numerical value recorded in the register is written after error is detected in the system, so that the data is accurate, and the accuracy of acquiring the data may be ensured. In the present embodiment, the above implementation for acquiring the error count is only taken as an example for introduction, and data acquisition modes of other approaches (for example, reading count values of Bad TLP (Transaction Layer Packet) count and Bad DLLP (Data Link Layer Packet) count registers) may all refer to the description in the present embodiment, and thus details are not described herein again.

At S102, whether the CE error count and the UCE error count reach corresponding error threshold values (namely, whether the CE error count reaches an error threshold value corresponding to the CE error count and the UCE error count reaches an error threshold value corresponding to the UCE error count) is determined.

Although the system will start and trigger the repair when the CE occurs, so as to solve the influence of the CE on the system, but if a plurality of PCIe CEs occur within a short time, it may indicate the existence of a problem in Signal Integrity (SI) signal quality, which needs to be handled in time, otherwise a large number of CEs may continue to occur in the system, which not only affects the normal operation of the system, but also affects the operation efficiency of the system.

When the UCE is triggered, the problem is relatively serious. The uncorrectable error is classified into Non-Fatal error and Fatal error, which may lead to problems such as data transmission error and data transmission rate reduction, thereby affecting the performance of the server, resulting in machine crash or restart and even normal operation failure of the device. According to the related art, the UCE may only be solved by operation and maintenance personnel, if the operation and maintenance personnel do not discover or solve and repair the UCE in time, immeasurable influence of the UCE on operation of the system may be generated.

In the present embodiment, in order to avoid the influence of frequent occurrence of the CE on the operation efficiency and stability of the system during operation of the system and to avoid the influence of the untimely manual handling of the UCE on operation of the system, an error threshold value corresponding to the CE error count and an error threshold value corresponding to the UCE error count are set, and fault determination is performed based on the CE error count and the UCE error count according to the two threshold values, that is, whether the CE error count reaches the corresponding error threshold value and whether the UCE error count reaches the corresponding error threshold value are respectively determined. The numerical value settings of the two error threshold values are not limited in the present embodiment, and may be correspondingly set according to actual experience, for example, the CE error count may be set to be 50, the error threshold value corresponding to the UCE error count may be set to be 1, and the like, and details are not described herein again.

At S103, in response to determining that the CE error count reaches the corresponding error threshold value (namely, the error threshold value corresponding to the CE error count), or the UCE error count reaches the corresponding error threshold value (namely, the error threshold value corresponding to the UCE error count), an error device is positioned and removed.

If the CE error count reaches the corresponding error threshold value, it indicates that the current CE occurrence frequency is relatively high, which may affect the operation stability and the operation efficiency of the system. If the UCE error count reaches the corresponding error threshold value, it indicates the presence of the UCE, which may affect operation of the system.

In the present embodiment, when the CE error count reaches the corresponding error threshold value, or the UCE error count reaches the corresponding error threshold value, or, when the CE error count and the UCE error count reach their respective corresponding error threshold values at the same time, it is determined that there is a device fault, and fault auto-repair in the following operations is started.

In the fault auto-repair, the error device needs to be positioned at first, the machine fault is reported, and meanwhile, the error device is temporarily removed from the entire set of devices in operation, so as to avoid the continuous influence of the error device on operation of the system. The implementation for positioning the error device is not limited in the present embodiment. For example, a B/D/F number in the error information may be read, and a device corresponding to the B/D/F number is determined as the error device. In the present embodiment, the above positioning mode is only taken as an example for introduction, and other implementations may refer to the introduction in the present embodiment, which is not limited herein.

The processing mode in a case where the CE error count does not reach the corresponding error threshold value, or the UCE error count does not reach the corresponding error threshold value is not limited in the present embodiment. As an exemplary implementation, no response may be made in a case where the CE error count does not reach the corresponding error threshold value, or the UCE error count does not reach the corresponding error threshold value. As another exemplary implementation, in a case where the CE error count does not reach the corresponding error threshold value, or the UCE error count does not reach the corresponding error threshold value, prompt information may be output to prompt related technicians to perform manual maintenance after seeing the prompt information, etc.

At S104, a parameter to be called corresponding to the error device is read, from pre-stored PCIe optimization parameters, as a target parameter.

After it is confirmed that the error device is removed and it is ensured that the error device will not continue to generate negative influence of operation of the system, the PCIe SI parameter of the error device is revised. The cause of frequent occurrence of the CE and UCE may be that an SI value obtained by automatic training (a PCIe link training process) of the PCIe protocol is not an optimal value, if the most appropriate SI parameter is not obtained in the automatic training process, a UCE error may be generated, or a large number of CE errors may be generated within a short time. Therefore, in the present embodiment, after it is determined that the device is faulty, the SI value of the error device is corrected to repair the faulty device.

In the present embodiment, one or more groups of PCIe optimization parameters are set in advance. The PCIe optimization parameters include one or more groups of SI recommended values of each PCIe device, and each of the one or more SI recommended values of each device is a recommended SI parameter which is set in advance and has a good data processing effect. When it is determined in an actual operation process that the error device is faulty (that is, the CE error count reaches the corresponding error threshold value, or the UCE error count reaches the corresponding error threshold value), the SI value of the error device is optimized and replaced according to the pre-stored PCIe optimization parameters, so as to modify the SI parameter of the error device and a relative port, for example, a TX Preset value in a Lane Equalization Control register. The recommended parameter has been set in the EEPROM of the BMC in advance, and when the parameter needs to be called, the BIOS communicates with the BMC, and optimization parameter values recommended in sequence are acquired according to the B/D/F of the PCIe device. The SI parameters of the devices other than the error device in the PCIe link may not be adjusted, which is not limited herein.

In the present embodiment, the storage format of the pre-stored PCIe optimization parameters is not limited. SI parameters corresponding to all devices at different reading priorities may be set, or SI parameters of different reading priorities corresponding to different devices may be set. In addition, the mode for identifying the SI parameters of the devices is not limited, a device name may be used as a retrieval condition, other unique information of the devices may also be used as the retrieval condition, and the storage format may be set according to actual use requirements.

The implementation for reading, from the pre-stored PCIe optimization parameters, the parameter to be called corresponding to the error device may include the following operations.

(1) The PCIe optimization parameters stored in a BMC EEPROM are read.

(2) A corresponding SI parameter storage location is determined as a target location according to a B/D/F number of the error device.

The Bus/Device/Function Number (B/D/F number) of the PCIe device in the server of the same configuration is fixed, therefore the B/D/F number is used as a device retrieval condition in the present embodiment. Meanwhile, the PCIe optimization parameters are stored according to the sequence of the B/D/F numbers of the devices, such that the retrieval speed may be increased, and the fault repair efficiency may be improved.

(3) An optimization parameter with highest priority at the target location is determined as the parameter to be called.

One or more groups of optimization SI parameters are obtained for each PCIe device via testing in advance, wherein each group of optimization SI parameters includes a device TX preset value, an uplink port Rx coefficient parameter, an uplink port Tx preset value, a device Rx coefficient parameter and the like. The optimization SI parameters are stored according to the sequence of the B/D/F numbers of the device (the storage location is not limited in the present embodiment, it is taken as an example in the present embodiment that the optimization SI parameters are stored in the EEPROM of the BMC and may also be stored at other locations, the implementation may refer to the present embodiment, and thus details are not described herein again). As shown in FIG. 2, which is a schematic diagram of a storage format of the optimization parameters in the EEPROM, this parameter storage mode is only taken as an example for introduction in the present embodiment, other storage modes may refer to the introduction in the present embodiment, and thus details are not described herein again.

(4) The parameter to be called is read.

In the parameter reading method provided in the present embodiment, the BIOS communicates with the BMC to read the PCIe optimization parameters stored in the BMC EEPROM, the corresponding SI parameter storage location is found according to the B/D/F number of the PCIe device, and recommended optimization parameter values are sequentially read, as parameters to be called, from high to low according to the priority (for example, the arrangement sequence is used as the priority, and the parameters are sequentially read from front to back, and this priority setting and determination mode is only taken as an example for introduction in the present embodiment).

At S105, the default SI parameter of the error device is replaced with the target parameter.

The default SI parameter of the error device is replaced with the target parameter, for example, the Tx Preset value is written into a Lane Equalization Control register, the Rx coefficient is written into an Rx coefficient register, and the error device is controlled to perform data processing according to the target parameter. It should be noted that, after the original control default SI parameter in the error device is replaced with the target parameter, the process of the error device performing data processing according to the target parameter may refer to the above operations, and thus details are not described here again.

At S106, the error device is accessed to the system as a normal device.

In the operation S103, in order to avoid the influence of the error device on operation of the system, the error device is removed from the system, after being repaired by the operations S104 and S105, the error device may be re-accessed to the system as the normal device, so as to increase the number of available devices in the system, thereby improving the system processing efficiency.

Further, in order to improve the normal operation of the device after the error device is accessed to the system, before the error device is accessed to the system as the normal device, the following operations may be further executed.

(1) The error device is accessed to the system as a suspicious device.

As an exemplary implementation, the error device may be added with a suspicious label to indicate the error device as the suspicious device, or the error device may be monitored as a key monitoring object. The mode of indicating the error device as the suspicious device is not limited in the present embodiment.

(2) The operation of acquiring the CE error count and the UCE error count in the PCIe link is executed until the CE error count does not reach the corresponding error threshold value and the UCE error count does not reach the corresponding error threshold value, and when the CE error count does not reach the corresponding error threshold value and the UCE error count does not reach the corresponding error threshold value, the operation of accessing the error device to the system as the normal device is executed.

After the SI parameter of the error device is optimized, the error device is monitored again, the BIOS serves a PCIe error register to check whether there is UCE and a large amount of CE errors within a short time, if so, optimization is continued, and if there is no error, after the device runs stably, a cluster operating system is notified to access the device to the system as a normal device: if there is still a large number of UCEs or a large number of CE errors within a short time, an optimization parameter of a second priority is called to optimize the SI parameter of the error device again, the operation stability of the device accessing to the system may be ensured in the above mode, thereby ensuring the operation stability of the system.

Based on the above introduction, in the technical solutions provided by the embodiments of the present disclosures, when the PCIe link in the system runs, an operation state of the system is monitored by acquiring the CE error count and the UCE error count in the PCIe link: in response to determining that the CE error count reaches the corresponding error threshold value, or the UCE error count reaches the corresponding error threshold value, it is determined that the current PCIe is faulty, the error device is removed from the system to avoid continuous adverse influence of continuous operation of the error device on operation of the system. Moreover, an SI parameter register of the error device is modified according to pre-stored optimization parameters of all PCIe devices in the server, the SI parameter of the error device is automatically optimized, and the error device is re-accessed to the system after the PCIe fault repair performed by optimizing the SI parameter, thereby realizing fault auto-repair, and thus reducing the implementation cost and adverse influence on operation of the system, which are caused by the participation of operation and maintenance personnel and server customer service personnel in device replacement, and optimizing operation of the system.

Corresponding to the above method embodiments, the embodiments of the present disclosure further provide a PCIe fault auto-repair apparatus, and the PCIe fault auto-repair apparatus described below and the PCIe fault auto-repair method described above may correspond and refer to each other.

Figure 3:
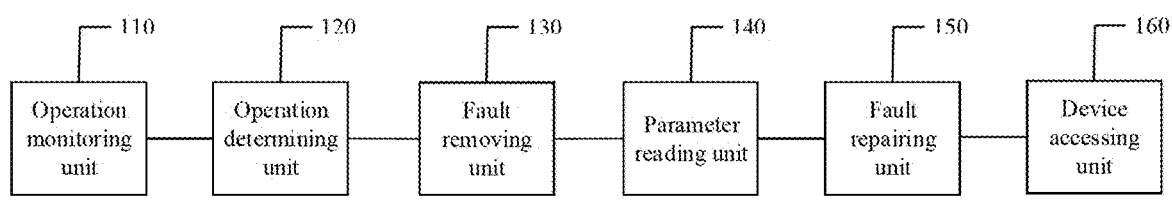
FIG. 3 is a schematic structural diagram of a PCIe fault auto-repair apparatus according to some embodiments of the present disclosure.

Referring to FIG. 3, the apparatus includes the following modules:
an operation monitoring unit 110 configured to, when a PCIe link performs data processing according to a default SI parameter, acquire a CE error count and a UCE error count in the PCIe link, wherein the default SI parameter is an SI parameter which is generated by automatic training after a system is started:
an operation determining unit 120, configured to determine whether the CE error count and the UCE error count reach corresponding error threshold values:
a fault removing unit 130 configured to, in response to determining that the CE error count reaches the corresponding error threshold value, or the UCE error count reaches the corresponding error threshold value, position an error device, and remove the error device:
a parameter reading unit 140, configured to read, from pre-stored PCIe optimization parameters, a parameter to be called corresponding to the error device as a target parameter:
a fault repairing unit 150, configured to replace the default SI parameter of the error device with the target parameter; and
a device accessing unit 160, configured to access the error device to the system as a normal device.

In an exemplary embodiment of the present disclosure, the operation monitoring unit includes:
a register polling sub-unit configured to, when the PCIe link performs the data processing according to the default SI parameter, poll a CE register and a UCE register of each PCIe device; and
a data reading sub-unit, configured to use a receiver error count recorded in the CE register as the CE error count, and use a receiver error count recorded in the UCE register as the UCE error count.

In an exemplary embodiment of the present disclosure, the parameter reading unit includes: a data reading sub-unit, configured to read the PCIe optimization parameters stored in a BMC EEPROM:
a data positioning sub-unit, configured to determine, as a target location, a corresponding SI parameter storage location according to a B/D/F number of the error device:
a target determining sub-unit, configured to determine, as the parameter to be called, an optimization parameter with highest priority at the target location; and a target reading sub-unit, configured to read the parameter to be called.

In an exemplary embodiment of the present disclosure, the PCIe fault auto-repair apparatus further includes: a suspicious device monitoring unit, wherein the suspicious device monitoring unit is configured to access the error device to the system as a suspicious device: trigger the operation monitoring unit to execute the operation of acquiring the CE error count and the UCE error count in the PCIe link; and until the CE error count does not reach the corresponding error threshold value and the UCE error count does not reach the corresponding error threshold value, trigger the device accessing unit to execute the operation of accessing the error device to the system as the normal device.

Corresponding to the above method embodiment, the embodiments of the present disclosure further provide a PCIe fault auto-repair device, and the PCIe fault auto-repair device described below and the PCIe fault auto-repair method described above may correspond and refer to each other.

The PCIe fault auto-repair device includes:
a memory, configured to store a computer program; and
a processor, configured to implement the operations of the PCIe fault auto-repair method in the above method embodiment when executing the computer program.

Figure 4:
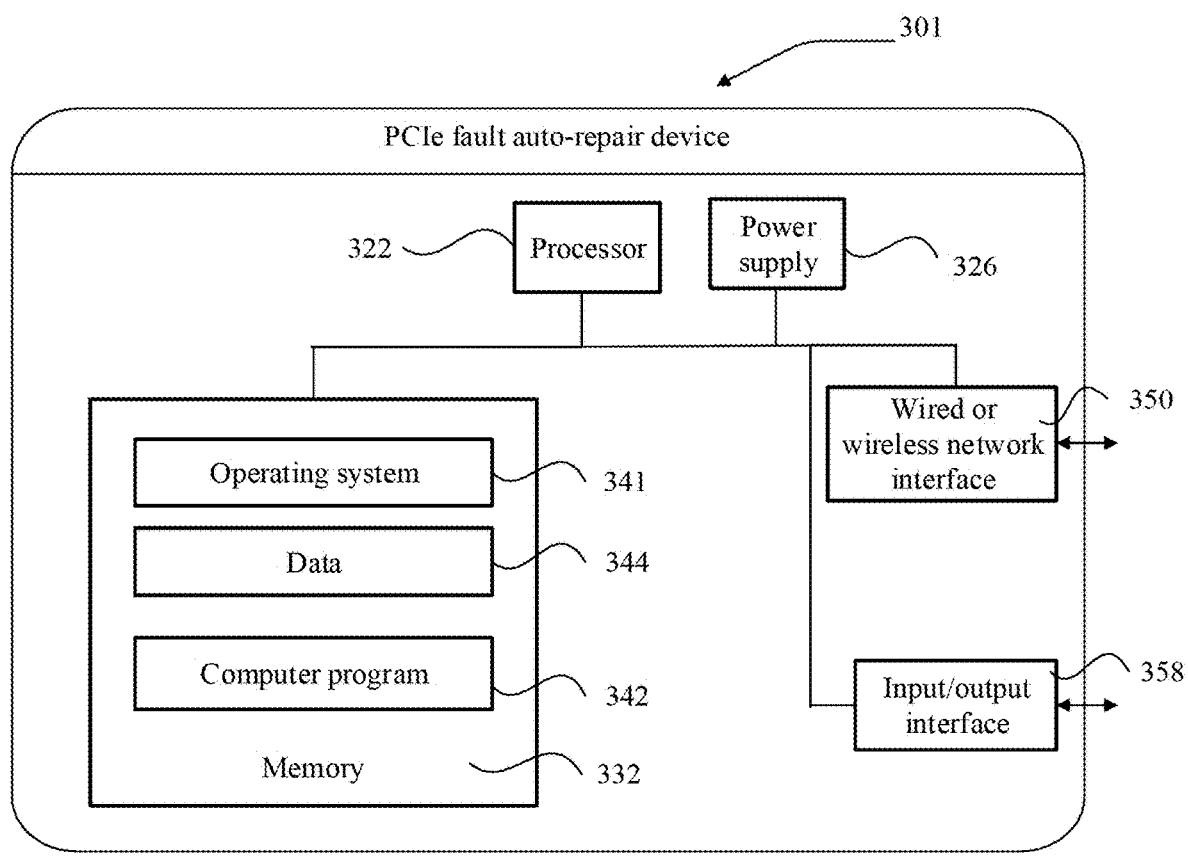
FIG. 4 is a schematic structural diagram of a PCIe fault auto-repair device according to some embodiments of the present disclosure.

Please refer to FIG. 4, which is an exemplary schematic structural diagram of a PCIe fault auto-repair device provided in the present embodiment, the PCIe fault auto-repair device may be designed differently based on different configurations or performances, and may generally include one or more Central Processing Units (CPUs) 322 (e.g., one or more processors) and a memory 332, and the memory 332 stores one or more computer application programs 342 or data 344, wherein the memory 332 may be a temporary memory or a persistent memory. The program stored in the memory 332 may include one or more modules (not shown in the figure), and each module may include a series of instruction operations in a data processing device. Further, the central processing unit 322 may be configured to communicate with the memory 332, so as to execute the series of instruction operations in the memory 332 on the PCIe fault auto-repair device 301.

The PCIe fault auto-repair device 301 may also include one or more power supplies 326, one or more wired or wireless network interfaces 350, one or more input/output interfaces 358, and/or, one or more operating systems 341.

The operations in the PCIe fault auto-repair method described above may be implemented by the structure of the PCIe fault auto-repair device.

Corresponding to the above method embodiment, the embodiments of the present disclosure further provide a readable storage medium, and the readable storage medium described below and the PCIe fault auto-repair method described above may correspond and refer to each other.

A computer program is stored on the readable storage medium, and the computer program, when executed by a processor, causes the processor to implement the operations of the PCIe fault auto-repair method in the above method embodiment.

The readable storage medium may be various readable storage media capable of storing program codes such as a USB flash disk, a mobile hard disk, a Read-Only Memory (ROM), a Random Access Memory (RAM), a magnetic disk, or an optical disk, etc.

Those having ordinary skill in the art may further realize that, the units and algorithm operations of various examples described in combination with the embodiments disclosed herein may be implemented by electronic hardware, computer software, or a combination of the two. In order to clearly illustrate this interchangeability of hardware and software, the compositions and operations of various examples have been generally described in the above description according to functions. Whether these functions are executed by hardware or software depends on practical applications and design constraints of the technical solutions. 10 Those having ordinary skill in the art may use different methods to implement the described functions for each particular application, but it should not be considered that this implementation exceeds the scope of the present disclosure.

What is claimed is:

1. A Peripheral Component Interconnect express (PCIe) fault auto-repair method, comprising:
when a PCIe link performs data processing according to a default Signal Integrity (SI) parameter, acquiring a Correctable Error (CE) error count and an Uncorrectable Error (UCE) error count in the PCIe link, wherein the default SI parameter is an SI parameter which is generated by automatic training after a system is started;
determining whether the CE error count reaches an error threshold value corresponding to the CE error count and the UCE error count reaches an error threshold value corresponding to the UCE error count;
in response to determining that the CE error count reaches the error threshold value corresponding to the CE error count, or the UCE error count reaches the error threshold value corresponding to the UCE error count, positioning an error device, and removing the error device;
reading, from pre-stored PCIe optimization parameters, a parameter to be called corresponding to the error device as a target parameter;
replacing the default SI parameter of the error device with the target parameter; and accessing the error device to the system as a normal device.

2. The PCIe fault auto-repair method according to claim 1, wherein when the PCIe link performs the data processing according to the default SI parameter, acquiring the CE error count and the UCE error count in the PCIe link comprises:
when the PCIe link performs the data processing according to the default SI parameter, polling a CE register and a UCE register of each PCIe device; and
using a receiver error count recorded in the CE register as the CE error count, and using a receiver error count recorded in the UCE register as the UCE error count.

3. The PCIe fault auto-repair method according to claim 1, wherein reading, from the pre-stored PCIe optimization parameters, the parameter to be called corresponding to the error device as the target parameter comprises:
reading the PCIe optimization parameters stored in a Baseboard Management Controller (BMC) Electrically Erasable Programmable Read Only Memory (EEPROM);
determining, as a target location, a corresponding SI parameter storage location according to a Bus/Device/Function (B/D/F) number of the error device;
determining, as the parameter to be called, an optimization parameter with highest priority at the target location; and
reading the parameter to be called.

4. The PCIe fault auto-repair method according to claim 3, wherein the PCIe optimization parameters are stored in the BMC EEPROM according to a sequence of B/D/F numbers of devices.

5. The PCIe fault auto-repair method according to claim 1, wherein before accessing the error device to the system as the normal device, the method further comprises:
  accessing the error device to the system as a suspicious device; and executing an operation of acquiring the CE error count and the UCE error count in the PCIe link, until the CE error count does not reach the error threshold value corresponding to the CE error count and the UCE error count does not reach the error threshold value corresponding to the UCE error count, executing an operation of accessing the error device to the system as the normal device.

6. The PCIe fault auto-repair method according to claim 5, wherein after accessing the error device to the system as the suspicious device, the method further comprises:
  in response to determining that the CE error count reaches the error threshold value corresponding to the CE error count, or the UCE error count reaches the error threshold value corresponding to the UCE error count, reading the PCIe optimization parameters stored in a Baseboard Management Controller (BMC) Electrically Erasable Programmable Read Only Memory (EEPROM); determining, as a target location, a corresponding SI parameter storage location according to a Bus/Device/Function (B/D/F) number of the suspicious device; determining an optimization parameter with second highest priority at the target location; reading the optimization parameter with the second highest priority; and replacing the parameter of the error device with the optimization parameter with the second highest priority.

7. The PCIe fault auto-repair method according to claim 1, wherein the default SI parameter comprises at least one of: a device Tx preset value, an uplink port Rx coefficient parameter, an uplink port Tx preset value, and a device Rx coefficient parameter.

8. The PCIe fault auto-repair method according to claim 1, wherein the PCIe link comprises one or more PCIe devices, and when the PCIe link performs the data processing according to the default SI parameter, all of the one or more PCIe devices in the PCIe link perform the data processing according to the default SI parameter.

9. The PCIe fault auto-repair method according to claim 1, further comprising:
  after the system is started, setting an automatic error report mechanism in the system;
  when a PCIe error occurs in the system, reporting, by a Basic Input Output System (BIOS), the PCIe error to a Baseboard Management Controller (BMC) after acquiring the PCIe error, and recording, by the BIOS, the CE error count or the UCE error count depending upon whether the PCIe error is a CE error or a UCE error.

10. The PCIe fault auto-repair method according to claim 1, further comprising:
  after the system is started, setting an error detection mechanism in the system;
    when a PCIe error occurs in the system, detecting, by the error detection mechanism, the PCIe error, and recording the CE error count or the UCE error count depending upon whether the PCIe error is a CE error or a UCE error.

11. The PCIe fault auto-repair method according to claim 1, wherein when the PCIe link performs the data processing according to the default SI parameter, acquiring the CE error count and the UCE error count in the PCIe link comprises:
  when the PCIe link performs the data processing according to the default SI parameter, reading count values of a Bad Transaction Layer Packet count register and a Bad Data Link Layer Packet count register; and
  acquiring the CE error count and the UCE error count in the PCIe link based on the count values of the Bad Transaction Layer Packet count register and the Bad Data Link Layer Packet count register.

12. The PCIe fault auto-repair method according to claim 1,
  wherein positioning the error device comprises:
  reading a Bus/Device/Function (B/D/F) number in error information, and determining a device corresponding to the B/D/F number as the error device.

13. A Peripheral Component Interconnect express (PCIe) fault auto-repair device, comprising:
  a memory, configured to store a computer program; and
  a processor, configured to implement following operations when executing the computer program:
  when a PCIe link performs data processing according to a default Signal Integrity (SI) parameter, acquiring a Correctable Error (CE) error count and an Uncorrectable Error (UCE) error count in the PCIe link, wherein the default SI parameter is an SI parameter which is generated by automatic training after a system is started;
  determining whether the CE error count reaches an error threshold value corresponding to the CE error count and the UCE error count reaches an error threshold value corresponding to the UCE error count;
  in response to determining that the CE error count reaches the error threshold value corresponding to the CE error count, or the UCE error count reaches the error threshold value corresponding to the UCE error count, positioning an error device, and removing the error device;
  reading, from pre-stored PCIe optimization parameters, a parameter to be called corresponding to the error device as a target parameter;
  replacing the default SI parameter of the error device with the target parameter; and accessing the error device to the system as a normal device.

14. The PCIe fault auto-repair device according to claim 13, wherein when the PCIe link performs the data processing according to the default SI parameter, acquiring the CE error count and the UCE error count in the PCIe link comprises:
  when the PCIe link performs the data processing according to the default SI parameter, polling a CE register and a UCE register of each PCIe device; and
  using a receiver error count recorded in the CE register as the CE error count, and using a receiver error count recorded in the UCE register as the UCE error count.

15. The PCIe fault auto-repair device according to claim 13, wherein reading, from the pre-stored PCIe optimization parameters, the parameter to be called corresponding to the error device as the target parameter comprises:
  reading the PCIe optimization parameters stored in a Baseboard Management Controller (BMC) Electrically Erasable Programmable Read Only Memory (EEPROM);
  determining, as a target location, a corresponding SI parameter storage location according to a Bus/Device/Function (B/D/F) number of the error device;

determining, as the parameter to be called, an optimization parameter with highest priority at the target location; and reading the parameter to be called.

16. The PCIe fault auto-repair device according to claim 13, wherein the processor is configured to further implement following operations before accessing the error device to the system as the normal device:

accessing the error device to the system as a suspicious device; and executing an operation of acquiring the CE error count and the UCE error count in the PCIe link, until the CE error count does not reach the error threshold value corresponding to the CE error count and the UCE error count does not reach the error threshold value corresponding to the UCE error count, executing an operation of accessing the error device to the system as the normal device.

17. A non-transitory readable storage medium, wherein a computer program is stored on the non-transitory readable storage medium, and the computer program, when executed by a processor, causes the processor to implement following operations:

when a Peripheral Component Interconnect express (PCIe) link performs data processing according to a default Signal Integrity (SI) parameter, acquiring a Correctable Error (CE) error count and an Uncorrectable Error (UCE) error count in the PCIe link, wherein the default SI parameter is an SI parameter which is generated by automatic training after a system is started;

determining whether the CE error count reaches an error threshold value corresponding to the CE error count and the UCE error count reaches an error threshold value corresponding to the UCE error count;

in response to determining that the CE error count reaches the error threshold value corresponding to the CE error count, or the UCE error count reaches the error threshold value corresponding to the UCE error count, positioning an error device, and removing the error device;

reading, from pre-stored PCIe optimization parameters, a parameter to be called corresponding to the error device as a target parameter;

replacing the default SI parameter of the error device with the target parameter; and accessing the error device to the system as a normal device.

18. The non-transitory readable storage medium according to claim 17, wherein when the PCIe link performs the data processing according to the default SI parameter, acquiring the CE error count and the UCE error count in the PCIe link comprises:

when the PCIe link performs the data processing according to the default SI parameter, polling a CE register and a UCE register of each PCIe device; and using a receiver error count recorded in the CE register as the CE error count, and using a receiver error count recorded in the UCE register as the UCE error count.

19. The non-transitory readable storage medium according to claim 17, wherein reading, from the pre-stored PCIe optimization parameters, the parameter to be called corresponding to the error device as the target parameter comprises:

reading the PCIe optimization parameters stored in a Baseboard Management Controller (BMC) Electrically Erasable Programmable Read Only Memory (EEPROM);

determining, as a target location, a corresponding SI parameter storage location according to a Bus/Device/Function (B/D/F) number of the error device;

determining, as the parameter to be called, an optimization parameter with highest priority at the target location; and reading the parameter to be called.

20. The non-transitory readable storage medium according to claim 17, wherein the computer program, when executed by the processor, causes the processor to further implement following operations before accessing the error device to the system as the normal device:

accessing the error device to the system as a suspicious device; and executing an operation of acquiring the CE error count and the UCE error count in the PCIe link, until the CE error count does not reach the error threshold value corresponding to the CE error count and the UCE error count does not reach the error threshold value corresponding to the UCE error count, executing an operation of accessing the error device to the system as the normal device.

* * * * *